United States Patent [19]

Choi

[11] Patent Number: 6,041,162

[45] Date of Patent: Mar. 21, 2000

[54] METHOD FOR RECORDING VIDEO SIGNALS BY STORING DIGITAL VIDEO DATA INTO DCT BLOCKS FOR A DIGITAL VCR

[75] Inventor: Byeongho Choi, Jeonrabook-Do, Rep. of Korea

[73] Assignee: LG Electronics Inc., Seoul, Rep. of Korea

[21] Appl. No.: 08/859,841

[22] Filed: May 21, 1997

Related U.S. Application Data

[63] Continuation-in-part of application No. 08/492,700, Jun. 20, 1995, abandoned.

[30] Foreign Application Priority Data

Jun. 24, 1994 [KR] Rep. of Korea ..................... 94/14631

[51] Int. Cl.[7] ............................................... H04N 5/76
[52] U.S. Cl. ........................................... 386/124; 386/111
[58] Field of Search ................................... 386/111, 124, 386/6–8, 33, 40, 68, 81, 109, 112; 360/32, 48; H04N 5/76, 5/92, 9/79, 5/78, 5/782, 5/7822, 5/7824, 5/7826, 5/7828

[56] References Cited

U.S. PATENT DOCUMENTS

| | | |
|---|---|---|
| 5,047,852 | 9/1991 | Hanyu et al. ........................... 386/112 |
| 5,341,250 | 8/1994 | Uchida et al. .......................... 386/112 |
| 5,699,475 | 12/1997 | Oguro et al. ............................ 386/112 |
| 5,781,690 | 7/1998 | Juri et al. ................................ 386/111 |
| 5,852,706 | 12/1998 | Ogikubo et al. ........................ 386/111 |

*Primary Examiner*—Thai Tran
*Attorney, Agent, or Firm*—Birch, Stewart, Kolasch & Birch, LLP

[57] ABSTRACT

In a video data recording method for a digital video cassette tape recorder, wherein bit streams of video data are initially stored in video segments having remaining spaces, portions of the bit streams which are not initially stored in the video segments being sequentially stored in a memory as remaining bit streams, the video data recording method includes the steps of first comparing a size of the last remaining space of the video segments with a size of one remaining bit stream, second comparing the size of the last remaining space with a size of a next remaining bit stream based on the first comparison result, repeating the second comparing step until a remaining bit stream having a size which is not larger than the size of the last remaining space of the video segments is found, and storing the remaining bit stream found in the repeating step in the last remaining space of the video segments.

14 Claims, 12 Drawing Sheets

FIG. 2A
CONVENTIONAL ART

| | i=0 | i=1 | i=2 | i=3 | i=4 | i=5 |
|---|---|---|---|---|---|---|
| j=0 | (0,0) DCT BLOCK | (0,1) | (0,2) | (0,3) | (0,4) | (0,5) |
| j=1 | (1,0) | (1,1) | (1,2) | | | |
| j=2 | | | | | | |
| j=3 | | | | | | |
| j=4 | | | | | | |

| Y | Cr | Cb |

FIG. 2B
CONVENTIONAL ART i'=0, i'=1, i'=2, i'=3, i'=4, i'=5 j'=0, j'=1, j'=2, j'=3, j'=4

STA QND

14byte | 14byte | 14byte | 14byte | 10byte | 10byte

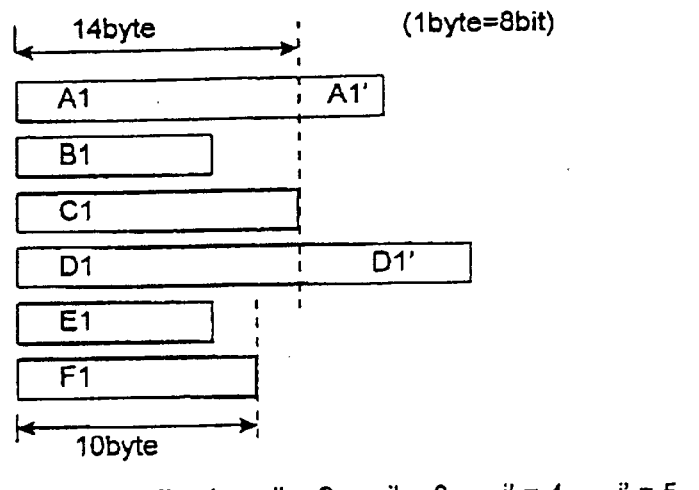
FIG.3A-1
CONVENTIONAL ART
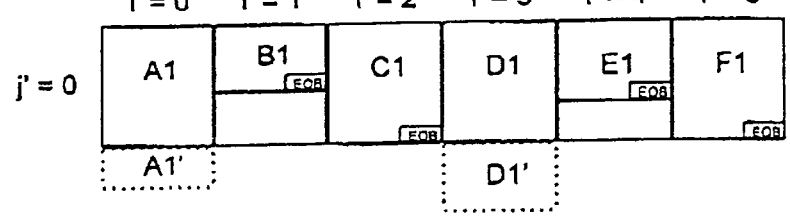
FIG.3B-1  j'=0
CONVENTIONAL ART
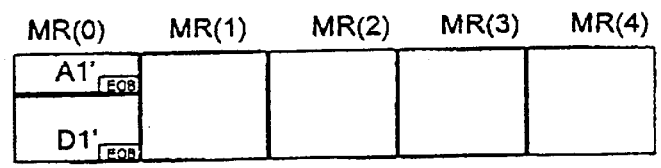
FIG.3C-1  MR
CONVENTIONAL ART
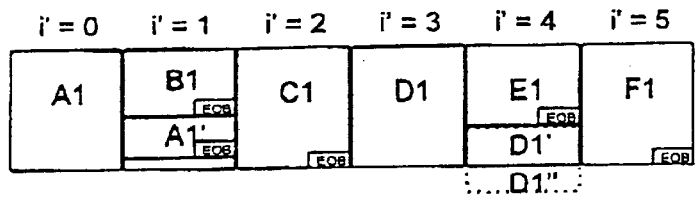
FIG.3D-1  j'=0
CONVENTIONAL ART
FIG.3E-1  VR
CONVENTIONAL ART

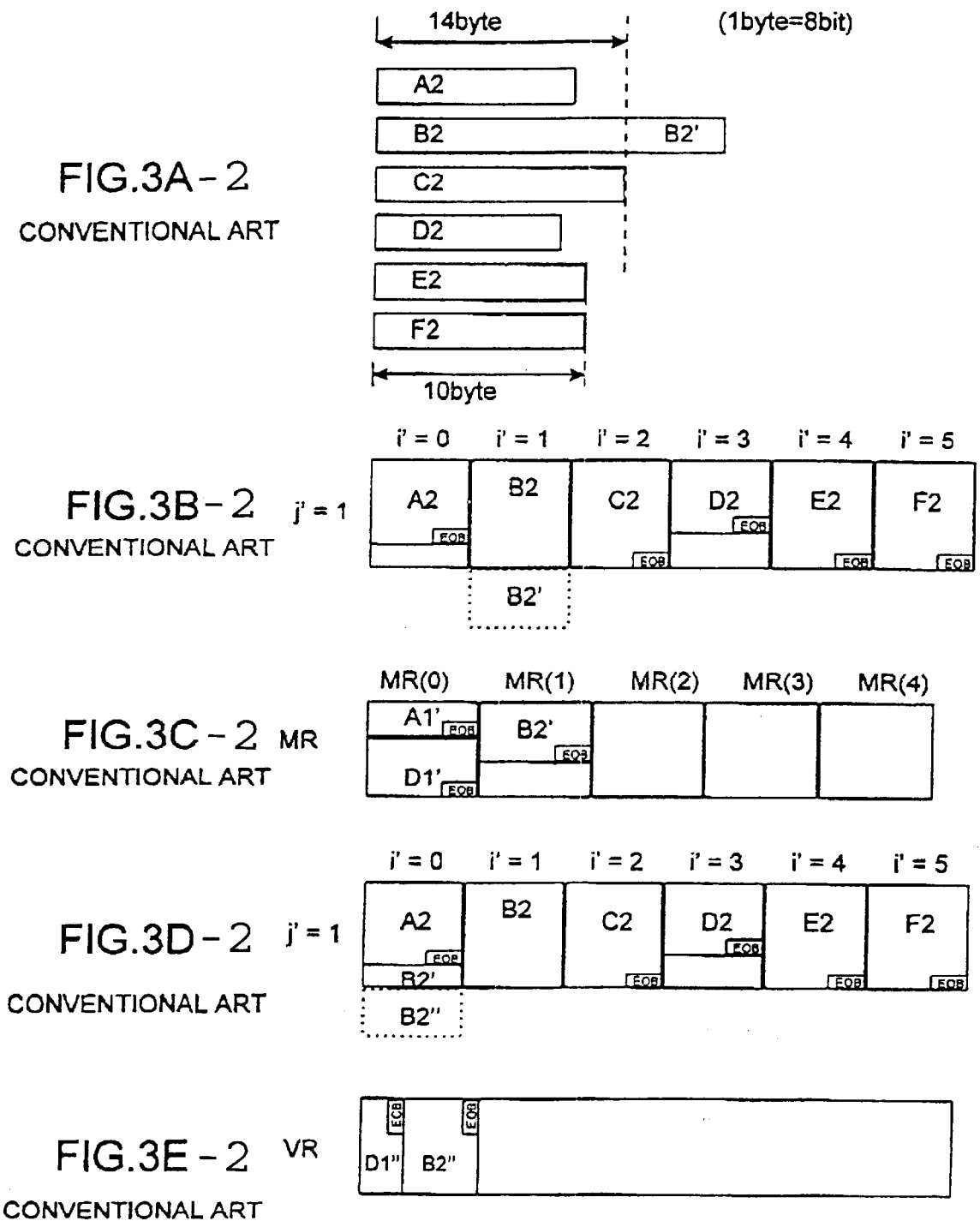

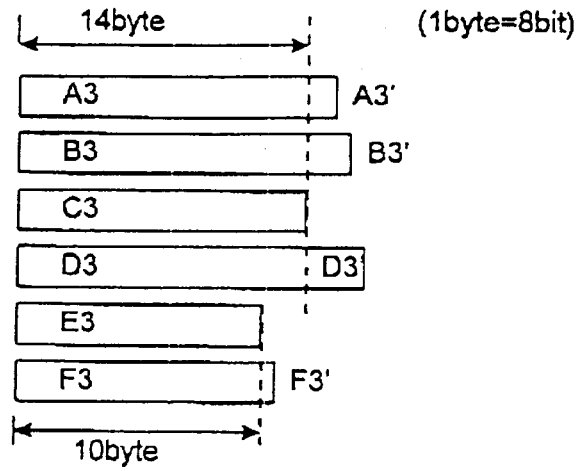
FIG.3A-3
CONVENTIONAL ART
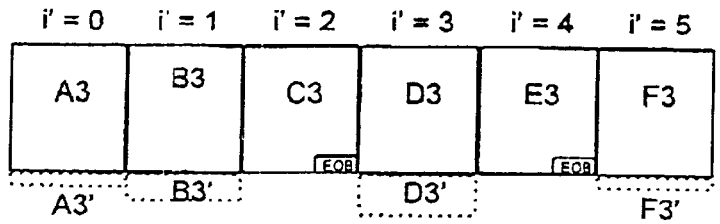
FIG.3B-3  j' = 2
CONVENTIONAL ART
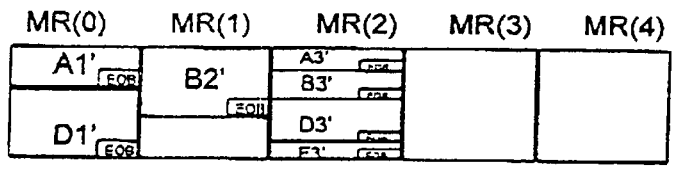
FIG.3C-3  MR
CONVENTIONAL ART
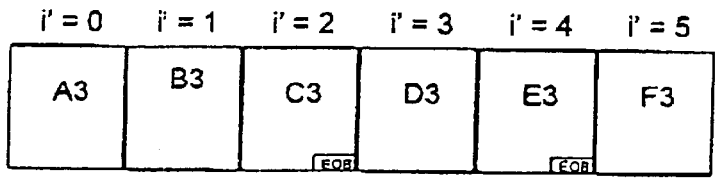
FIG.3D-3  j' = 2
CONVENTIONAL ART
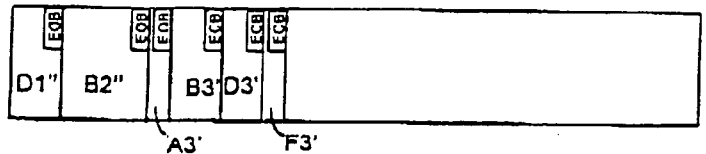
FIG.3E-3  VR
CONVENTIONAL ART FIG.3A-4
CONVENTIONAL ART
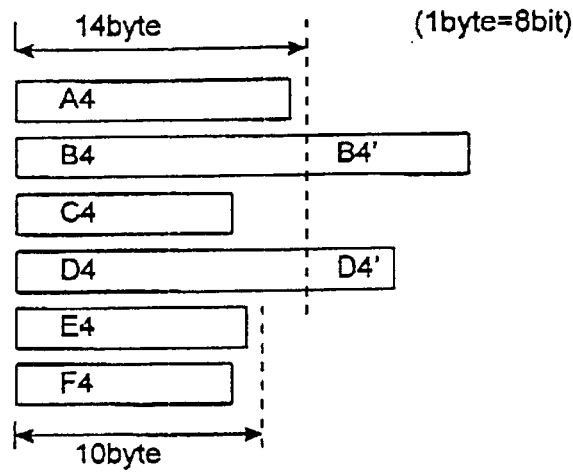
FIG.3B-4  j'=3
CONVENTIONAL ART
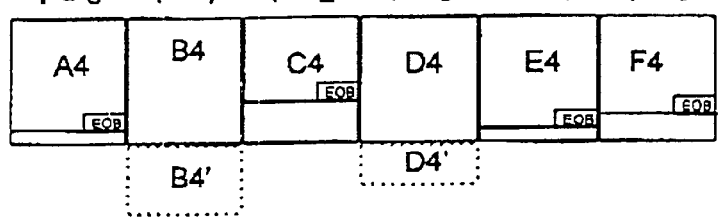
FIG.3C-4  MR
CONVENTIONAL ART
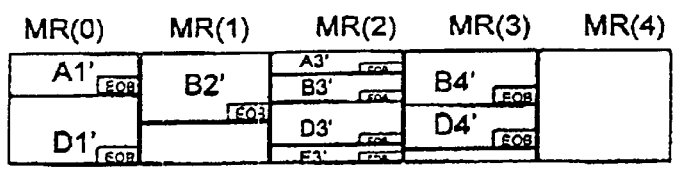
FIG.3D-4  j'=3
CONVENTIONAL ART
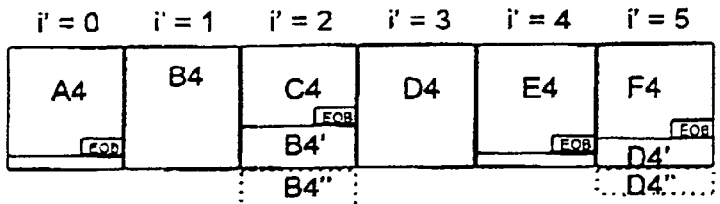
FIG.3E-4  VR
CONVENTIONAL ART
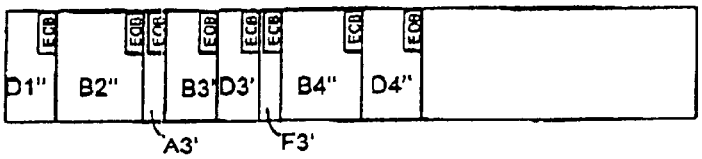

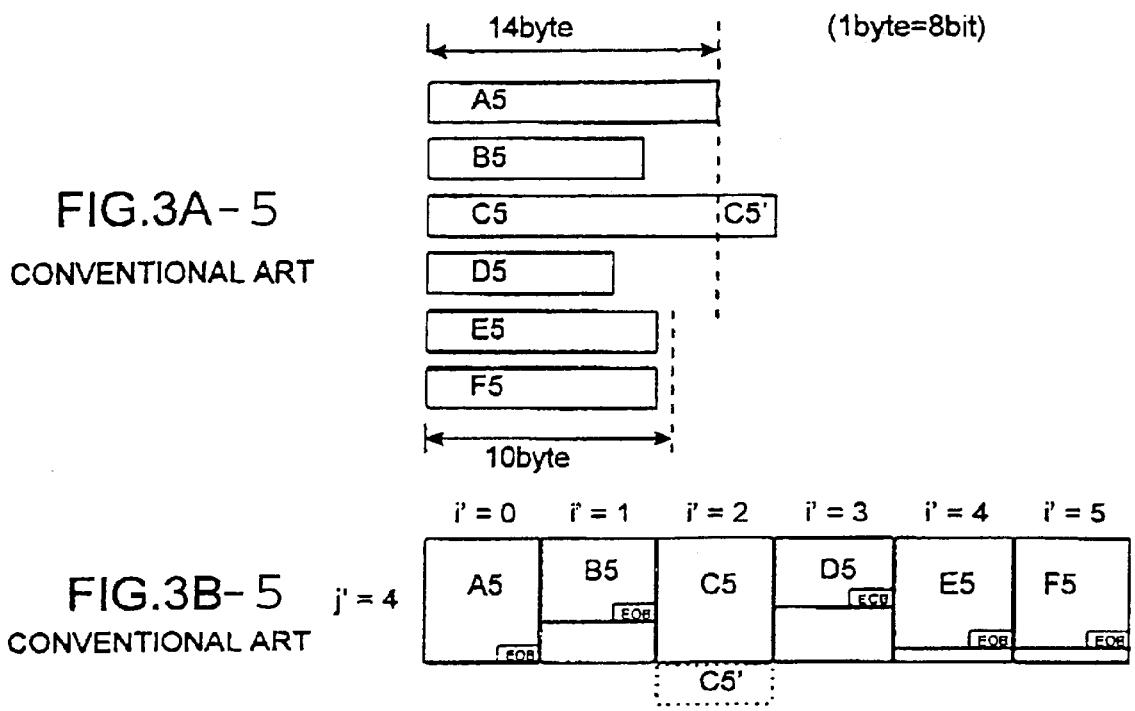
FIG.3A-5 CONVENTIONAL ART
FIG.3B-5 CONVENTIONAL ART
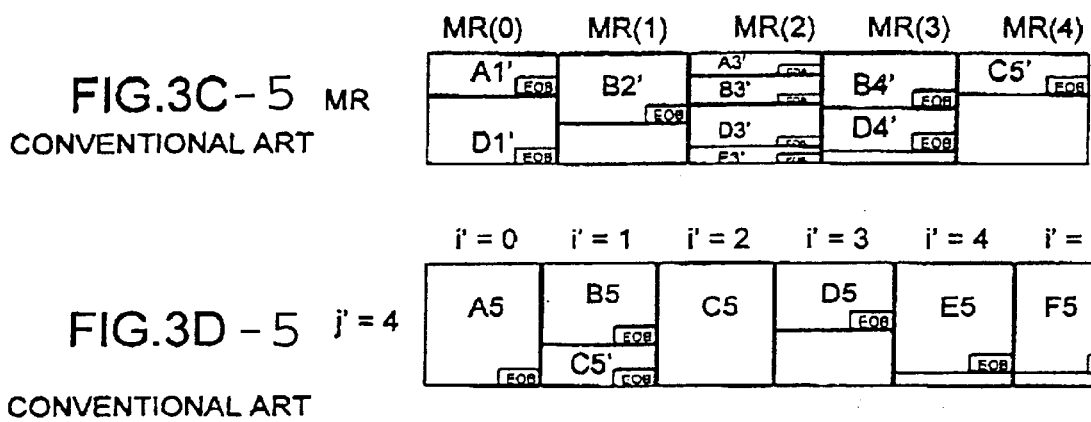
FIG.3C-5 MR CONVENTIONAL ART
FIG.3D-5 CONVENTIONAL ART
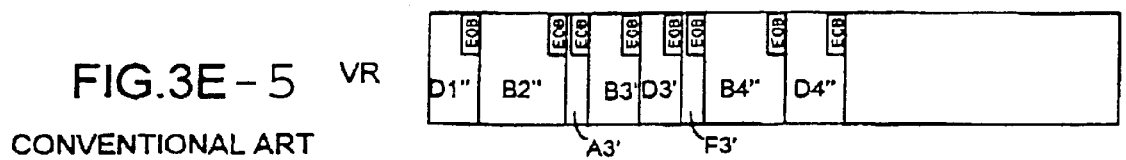
FIG.3E-5 VR CONVENTIONAL ART DCT block is a group of pixels.
(i',j') : address of a memory corresponding to each DCT blocks
A1 - F5 : bit streams

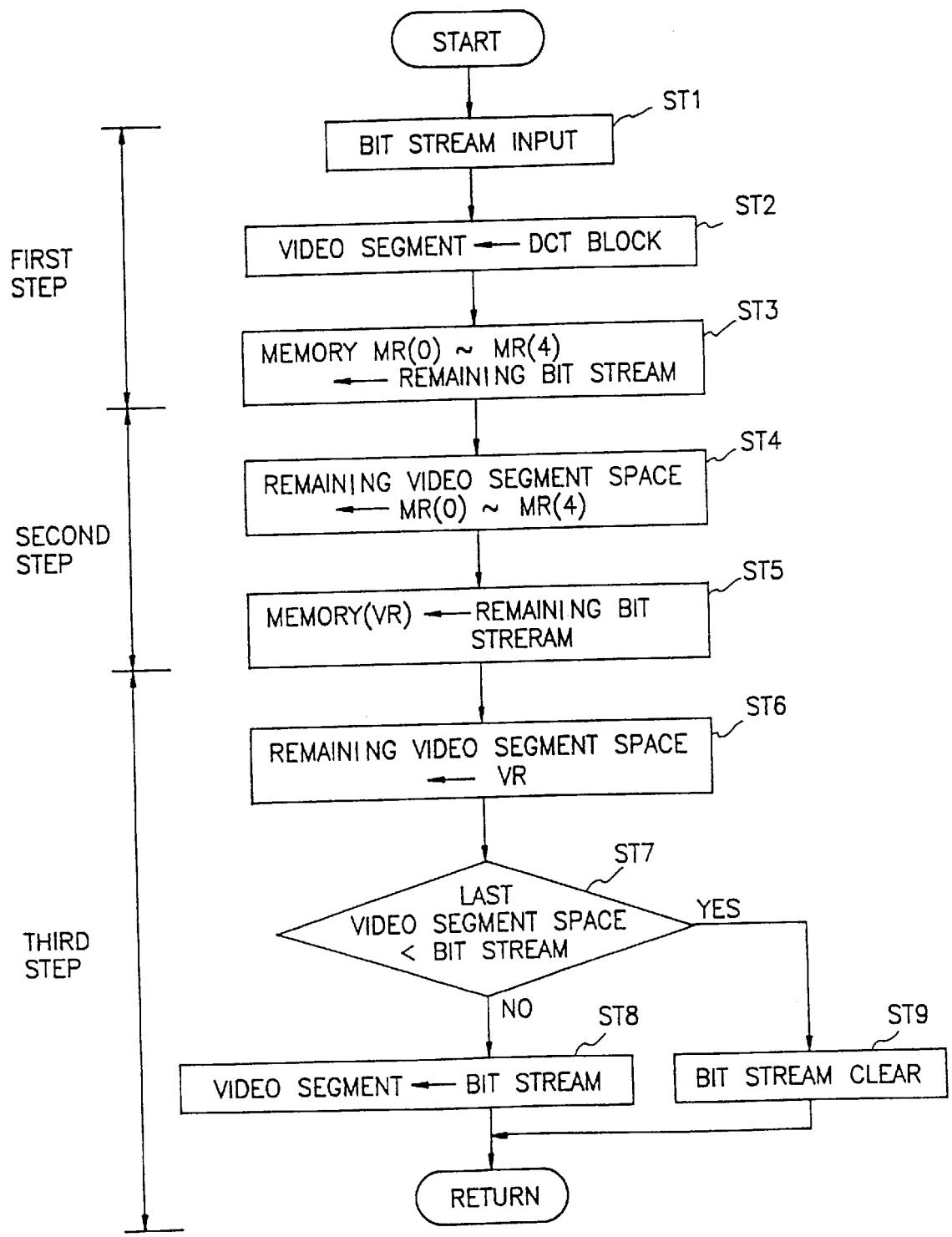

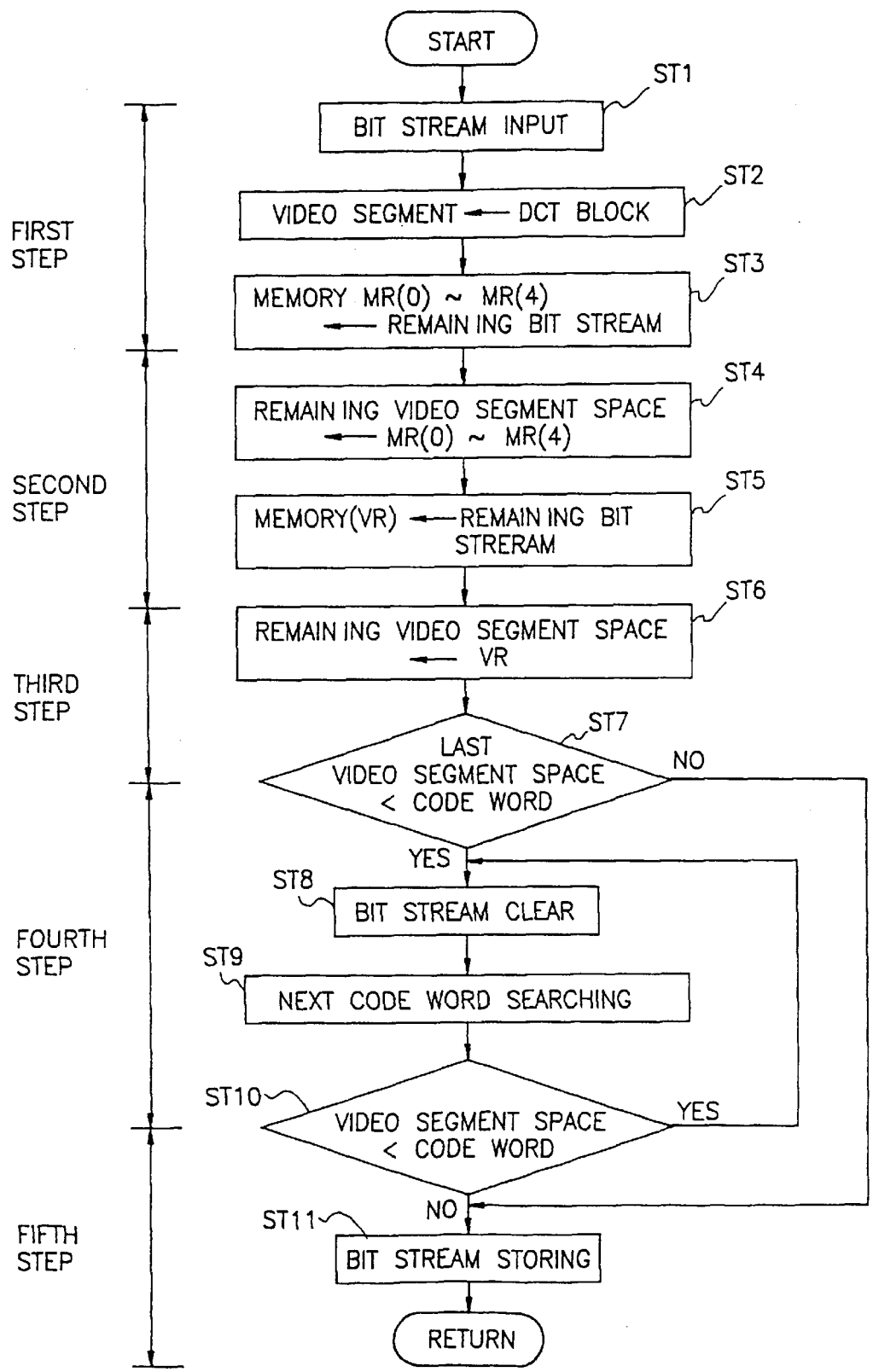

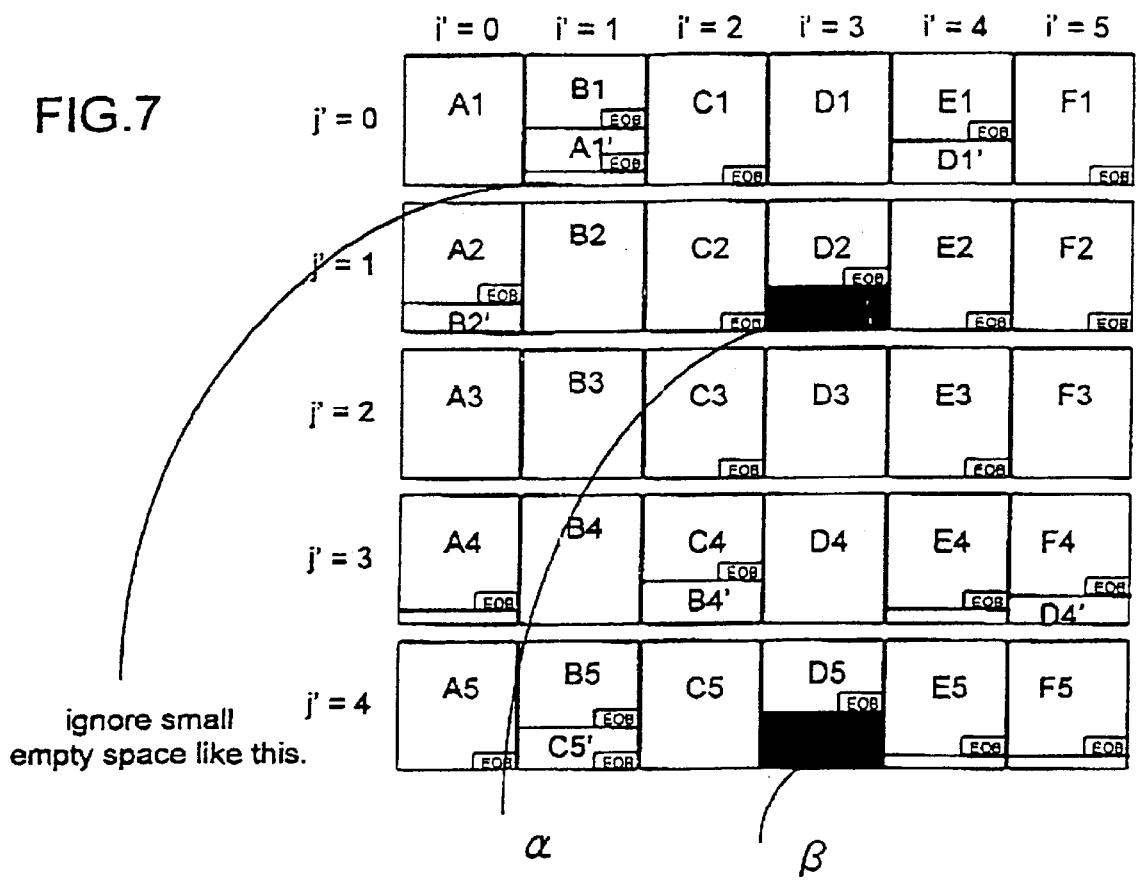

METHOD FOR RECORDING VIDEO SIGNALS BY STORING DIGITAL VIDEO DATA INTO DCT BLOCKS FOR A DIGITAL VCR

This application is a continuation-in-part of application Ser. No. 08/492,700 filed on Jun. 20, 1995, now abandoned the entire contents of which are hereby incorporated by reference.

BACKGROUND OF THE INVENTION

1. Field of the Invention

The present invention relates to a pictorial or video data recording method for a high definition video cassette tape recorder (hereinafter "HDVCR") or a digital video cassette tape recorder (hereinafter "DVCR"), and in particular to an improved video data recording method for a HDVCR or DVCR capable of very densely recording compressed video data on a video tape by improving a formatting method.

2. Description of the Conventional Art

Referring to FIG. 1, the conventional video data recording method for a high definition digital video cassette tape recorder includes a discrete cosine transforming circuit 1 provided for discrete-cosine-transforming an input video data (IVD) inputted thereto, a quantization circuit 2 provided for quantizing the output data outputted from the discrete cosine transforming circuit 1, a variable length coding circuit 3 provided for variable-length-coding the output data outputted from the quantization circuit 2 in a form of a bit stream, a formatting circuit 4 provided for formatting the output data outputted from the variable length coding circuit 3 into the type of data which can be recorded on a tape T, an error correction coding circuit 5 provided for adding an error correction code to the output data outputted from the formatting circuit 4, a record amplifying circuit 6 provided for amplifying the output data outputted from the error correction coding circuit 5 and for recording the amplified data on the tape T through a head H1, a reproduction amplifying circuit 7 provided for amplifying the recorded data of the tape T reproduced by a head H2, an error correction decoding circuit 8 provided for decoding the error correction code added to the output data outputted from the reproduction amplifying circuit 7 and for correcting the decoded video data, a deformatting circuit 9 provided for receiving the output data outputted from the error correction decoding circuit 8 and for formatting the received data into the original data form, a variable length decoding circuit 10 provided for variable-length-decoding the output data outputted from the deformatting circuit 9, a reverse quantization circuit 11 provided for reverse-quantizing the output data outputted from the variable length decoding circuit 10, and a reverse discrete cosine transforming circuit 12 provided for reverse-discrete-cosine-transforming the output data outputted from the reverse quantization circuit 11 and for outputting the original video data (OVD).

The operation of the conventional high definition VCR will now be explained with reference to FIGS. 2A through 4.

To begin with, as a reproducing mode is set, when a video data IVD of a frame is inputted into the discrete cosine transforming circuit 1 as shown in FIG. 1, the discrete cosine transforming circuit 1 transforms the video data IVD into a macro block consisting of four luminescent component DCT blocks (Y) shown in FIG. 2A and two chrominance component DCT block (Cr and Cb) through a shuffling process. Here, a segment block consists of five macro blocks, i.e., thirty DCT blocks. As shown in FIG. 2B, each luminescent component DCT block has 14 bytes, and each chrominance component DCT block has 10 bytes.

In addition, the video data consisting of one unit block by the discrete cosine transforming (DCT) circuit 1 is compressed by the quantization circuit 2 and inputted into the variable length coding circuit 3.

Thereafter, the variable length coding circuit 3 scans each DCT block in a manner of zig-zag and outputs the video data in a form of bit streams after a variable length coding, and the formatting circuit 4 performs a formatting step so as to record the serially outputted bit streams on the tape T.

Here, as shown in FIG. 4, the above described formatting step will now be explained in more detail, which consists of three steps.

In the first process, the bit streams are outputted from the variable length coding circuit 3, and the bit streams as shown in FIG. 3A-1 are compressively stored in a macro block of "j=0." That is, the bit stream of "A1+A1'" is compressively stored in a DCT block of a location (0,0) which is "j=0, i=0." The bit stream of "B1" is compressively stored in a DCT block of a location of (0,1). The bit stream of "C1" is compressively stored in a location (0,2). The bit stream of "D1+D1'" is compressively stored in a location of (0,3). The bit stream of "E1" is compressively stored in a location of (0,4). The bit stream of "F1" is compressively stored in a location of (0,5).

The bit streams each compressively stored in one of six DCT blocks which are in the macro block of "j=0" as shown in FIG. 3B-1, are stored in the DCT block of six compressed regions which are formed in the video unit of "j'=0"—step 2 in FIG. 4. That is, the bit stream A1 compressively stored in a DCT block provided in a location of (0,0) is stored in a DCT block of a compression region provided in a location of "j'=0, i'=0" (0,0), the bit stream B1 compressively stored in a location of (0,1) is compressively stored in a DCT block provided in a location of (0,1) and the bit stream C1 compressively stored in a DCT block of (0,2) is compressively stored in a DCT block of a compression region provided in a location of (0,2).

In addition, the bit stream D1 compressively stored in a DCT block of (0,3) is compressively stored in a DCT block of a compression region of (0,3), the bit stream E1 compressively stored in a DCT block of (0,4) is compressively stored in a DCT block of a compression region of (0,4), and the bit stream F1 compressively stored in a DCT block of (0,5) is compressively stored in a DCT block of a compression region (0,5).

In addition, as shown in FIG. 3B-1, the DCT block consisting of six compression regions can include full regions and empty regions.

Here, as shown in FIG. 3B-1, the remaining bit streams A1' and D1' obtained after the video segment provided in locations (0,0) and (0,3) is filled therewith, are serially stored in a memory MR(0) as shown in FIG. 3C-1 (step 3 in FIG. 4).

Similarly, the bit streams as shown in FIGS. 3A-2 to 3A-5 are compressively stored in the six DCT blocks provided in macro blocks of "j=1", "j=2", "j=3", and "j=4", respectively, as shown in FIGS. 3B-2 to 3B-5. Each of these bit streams is stored respectively in DCT blocks of six compression regions provided in a video unit of "j'=1", "j'=2", "j'=3" or "j'=4" (ST2), and the remaining bit streams obtained after the DCT blocks are filled therewith are correspondingly stored in the memories MR(1)–MR(4) as shown in FIGS. 3C-2 to 3C-5 (Step 3 in FIG. 4).

Here, as shown in FIGS. 3B-1 to 3B-5, at each end of the bit stream stored in each DCT block, a mark of EOB—End of Block—is provided.

In the second process (steps 4 and 5) the remaining bit stream compressively stored in each of the memories MR(0) through MR(4) is compressively stored in the empty space of a video unit of "j=0"—Step 4, after the remaining bit stream is stored in each of memories MR(0) through MR(4) in the step 3. In addition, the bit stream stored in the remaining memories MR(1) through MR(4) is compressively stored in the empty space of each video unit region.

That is, as shown in FIGS. 3D-1 to 3D-5, the bit stream compressively stored in the memory MR(0) is stored in the empty space of the video unit region of "j=0" in an order from "i'=0" to "i'=5"—Step 4, the bit stream stored in the memory MR(1) is compressively stored in the video unit region of "j'=1" in an order from "i'=0" to "i'=5"—Step 4, and the bit stream stored in the remaining memories MR(2) through MR(4) is compressively stored in each video unit region in the same manner as described above Step 4.

In addition, as shown in FIGS. 3D-1 to 3D-5, the remaining bit streams D1", B2", A3', D3', F3', B4" and D4" obtained after the bit streams stored in the memories MR(0) through MR(4) are stored in the empty spaces of the video units of "j'=0 to "j'=4", are stored in a memory VR as shown in FIGS. 3E-1 to 3E-5—Step 5.

In the third process (steps 6–9) as shown in FIG. 3F, the bit stream stored in the memory VR in the step 5 is serially stored in the empty portions of video unit regions of "j'=0" in the order from "i'=0" to "i'=5", "j'=1" in the order from "i'=0" to "i'=5," etc.—Step 6. If the bit stream D1" in the memory VR is smaller than the size of the empty space of the first DCT block having a space, the bit stream D1" is stored therein and the next empty space in the DCT blocks are searched to store the next bit stream in the memory VR.

The size of the empty space of the last DCT block having a space is compared to the size of the bit stream in the memory VR—Step 7.

As a result of the comparison, if the size of the empty space of such DCT block is larger than the size of the bit stream in the memory VR, this bit stream is stored in the video segment region thereof (i.e., in the empty space of the DCT block)—Step 8. However, if the size of the empty space of the DCT block is smaller than the size of the bit stream in the memory VR, the compared bit stream and all of the remaining bit streams stored in the memory VR are cleared, and the remaining region of the video segment remains empty—Step 9.

The above described formatting process of the video data outputted from the variable length coding circuit 3 is performed by the formatting circuit 4 so as to form data which can be recorded on the tape T. This formatted pictorial data is outputted to the error correction coding circuit 5, in which the error correction code is added. The video data with the error correction code is amplified by the record amplifying circuit 6 and is recorded on the tape T through the head H1.

Meanwhile, when the data recorded on the tape T is reproduced by the reproduction amplifying circuit 7 in accordance with a reproduction mode, the error correction decoding circuit 8 decodes the error correction codes added to the reproduction data and corrects the errors of the reproduced pictorial data, and then the deformatting circuit 9 receives the error-corrected data and transforms the recording format state into the original state.

At this time, the variable length decoding circuit 10 receiving the output data outputted from the deformatting circuit 9 recovers the video data in accordance with the variable length code, and the reverse quantization circuit 11 performs a reverse quantization on the recovered data, so that the compressed video data is decompressed.

Thereafter, the reverse discrete cosine transforming circuit 12 receiving the output data outputted from the reverse quantization circuit 11 performs a reverse discrete cosine transforming on the data inputted thereto and outputs the original video data.

However, in the conventional video data recording method, since the formatting process ends when the size of the last empty space of the partially filled video segment is smaller than the size of the video data stored in a memory, the empty space of the partially filled video segment remains empty and the recording space of a tape can not be effectively used. Further, bit stream data is lost because all the remaining bit streams stored in a memory VR are discarded when the size of the last empty space of the partially filled video segment is smaller than the size of the remaining bit stream. In addition, the picture quality during reproducing is poor.

SUMMARY OF THE INVENTION

Accordingly, it is an object of the present invention to provide a video data recording method for a digital video cassette tape recorder, which overcomes the problems encountered in the conventional video data recording method.

It is another object of the present invention to provide an improved video data recording method for DVCR or HDVCR capable of very densely recording compressed video data on a recording section of a video tape by improving a formatting method.

To achieve the above and other objects, there is provided a video data recording method for a high definition video cassette recorder of a digital video cassette tape recorder wherein a bit stream of a video data corresponding to a DCT block is stored in the video blocks, the bit stream which cannot be stored in the corresponding DCT block is stored in a memory and then serially stored in the remaining spaces of the DCT blocks, the video data recording method including the step of selecting a remaining bit stream which can be stored in the last empty space of video segments.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A shows a diagram of pictorial data of a frame consisting of 30 DCTs, the data being input to an element of FIG. 1;

FIG. 2B shows a diagram of 30 video segment regions each corresponding to one of 30 DCT blocks of FIG. 2A;

FIGS. 3A-1 through 3F show diagrams for explaining a formatting process of a video segment region of FIG. 2B in which a bit stream compressively stored in a DCT block of FIG. 2A is compressed;

FIG. 4 is a flow chart for explaining a conventional data formatting method;

FIG. 6 is a flow chart of a video data recording method of a high definition/digital VCR according to the embodiments of the present invention; and FIG. 7 shows video data efficiently stored in video segments according to the embodiments of the present invention.

DETAILED DESCRIPTION OF THE PREFERRED EMBODIMENTS

Referring to FIG. 6, a video data recording method for a high definition digital video cassette tape recorder according to the present invention includes a first process which serially stores a bit stream compressively stored in a DCT block into corresponding video segments (Step 2) and which stores the first remaining bit streams (i.e., unstored bit steams) obtained after the step 2 into the memories MR(0) through MR(4); a second process which stores the bit streams stored in the memories MR(0) through MR(4) into the empty spaces of the video segments (Step 4) and which stores the second remaining bit streams (i.e., remaining after the step 4) into the memory VR; a third process which serially stores the bit stream stored in the memory VR into the empty spaces of the video segments and which compares the size of each of the empty spaces of the remaining video segments obtained after the step 6 with the size of a code word to be stored in the empty space; a fourth process which sequentially stores the bit stream contained in the code word into the compared empty space of the video segment (Step 11) when the empty space of the video segment is larger than that of the code word, and when the empty space of the video segment is smaller than that of the code word, clears the bit stream up to the EOB of the corresponding code word (Step 8), the forth process which also scans the next code word (Step 9), and compares the size of the scanned code word with the size of the same empty space of the video segment; and a fifth process which repeatedly performs the steps 8, 9 and 10 if the size of the scanned code word is larger than that of the empty space of the video segment, and which stores the second remaining bit stream in the empty space of the video segment if the size of the scanned code word is smaller than that of such empty space of the video segment (step 11).

The operation of the video data recording method for a high definition digital video cassette tape recorder according to the present invention will now be explained with reference to FIGS. 1, 2 and 5.

Figure 1:
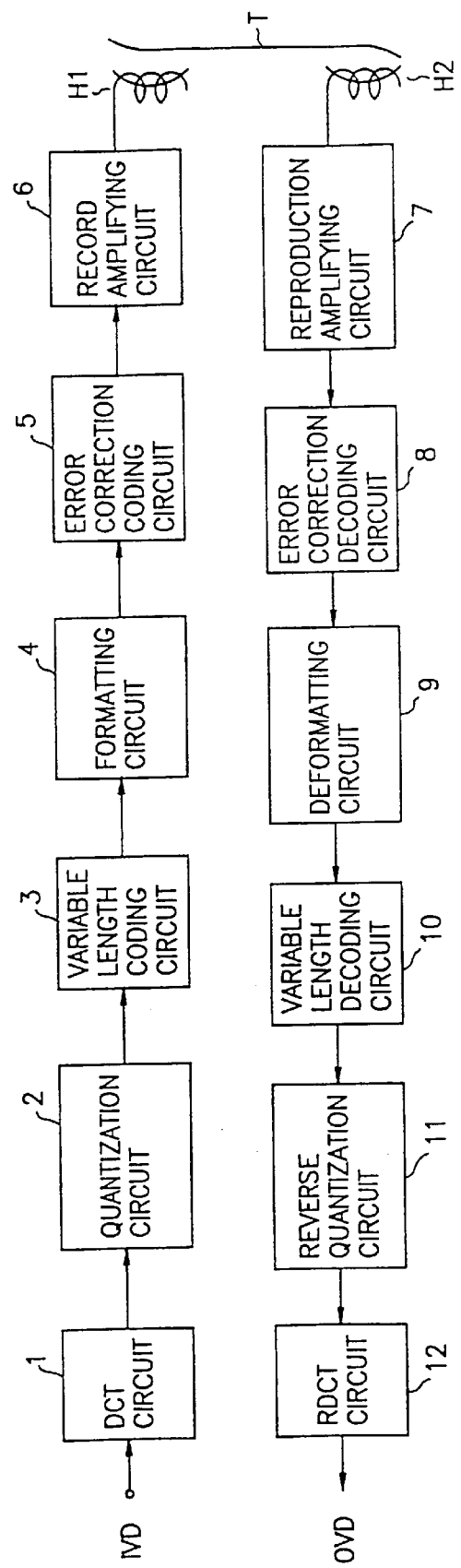
FIG. 1 shows a schematic block diagram showing a construction of a conventional HDVCR.
Figure 3F:
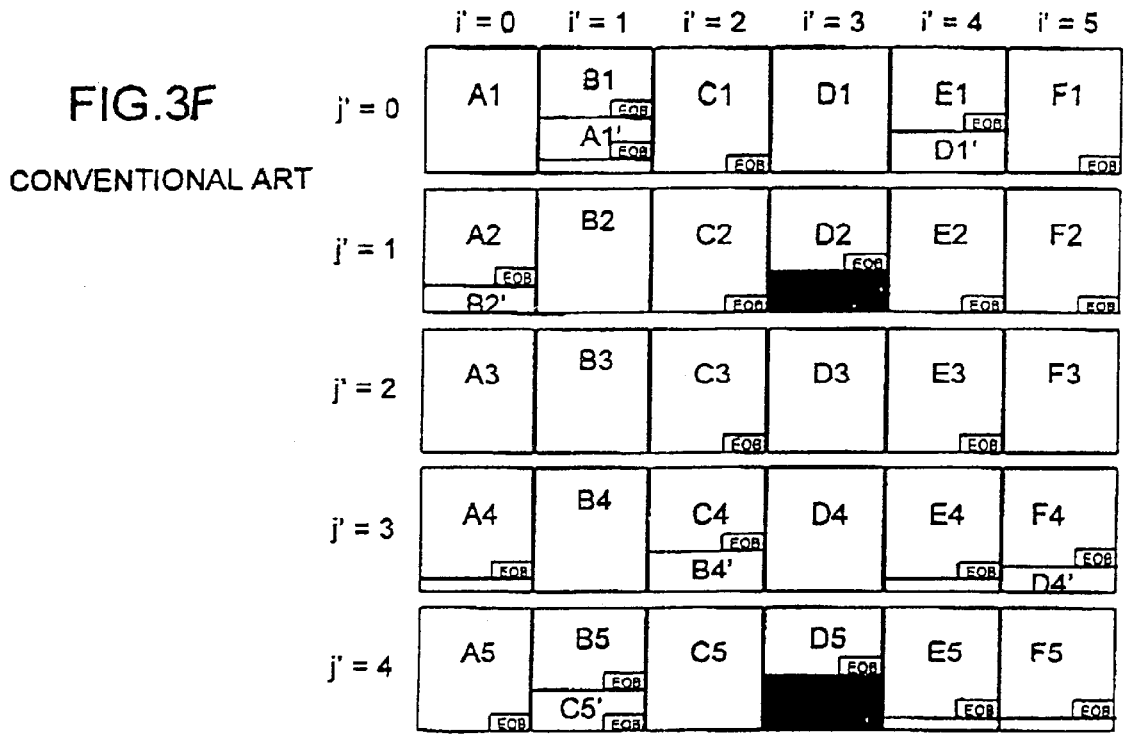

To begin with, as a recording mode is set, when a video data IVD of a frame is inputted into the discrete cosine transforming circuit 1 of FIG. 1, the discrete cosine transforming circuit 1 transforms the input video data IVD inputted thereto into the data in the form of a macro block having fourth luminescent component DCT blocks Y and two chrominance component DCT blocks Cr and Cb, as shown in FIG. 2A, so that one unit block is formed to have five macro blocks each of which having six DCT blocks.

The video data formed in the form of a unit block by the discrete cosine transforming circuit 1 is compressed by the quantization circuit 2 and is inputted into the variable length coding circuit 3.

Thereafter, the variable length coding circuit 3 scans each DCT block inputted thereto in a manner of a zig-zag and outputs the video data in a form of a bit stream after a variable length coding, and the formatting circuit 4 formats the bit stream so as to record on the tape T.

Here, as shown in FIG. 6, since the first process and the second process are the same as the first and second processes of the conventional formatting method, a detail description thereof is omitted.

The first remaining bit streams stored in the memory MR are stored in the empty spaces of video segments, and the second remaining bit streams obtained after the step 5 are stored in the memory VR. The second bit streams stored in the memory VR are sequentially stored in the empty spaces of the video segments—Step 6.

At this time in the process of storing the second remaining bit streams in the video segments, the size of the empty space of the last partially filled video segment from the step 6 and the size of a code word of one of the second remaining bit streams which is to be stored in the empty space, are compared with each other—Step 7. As a result of the above described comparison, when the size of the empty space of the last partially filled video segment is larger than that of the code word of the second remaining bit stream to be stored in the empty space, the portions of the second remaining bit stream contained in the code word are stored into the partially filled video segment—Step 11.

Here, the code word means compressed data which exists in the form of a bit stream.

Figure 5:
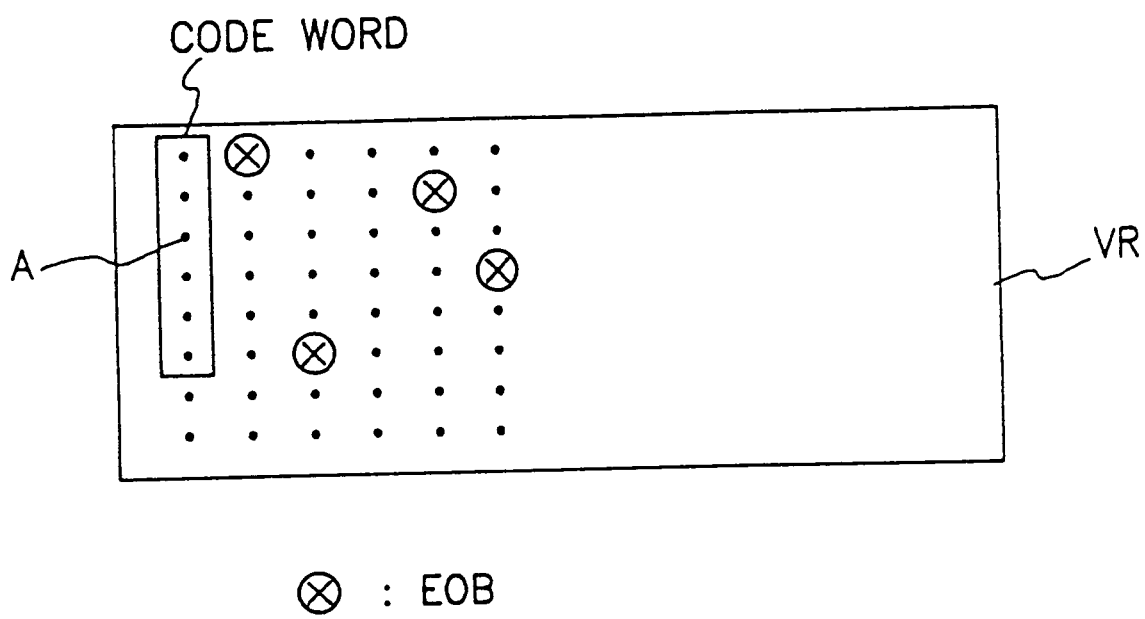
FIG. 5 is a diagram of data stored in a memory VR for explaining the present invention.

As shown in FIG. 5, one code word is a bit stream of one pictorial data stored in the memory VR. When the bit stream up to "A"-point stored in the memory VR is stored in the last empty space of the video segments and all the spaces of the video segments are full, there is no need to store the data into the video segment.

At step 7, if it is determined that the size of the last empty space of the video segments is smaller than the size of the present code word of bit stream stored in the memory VR, only the bit stream up to EOB of that block (the EOB denoting the end of one block stored in the memory VR) is cleared—Step 87. The code word of the next block is then scanned—Step 9.

Thereafter, the size of the last empty space of the video segments and the size of the next code word scanned in the step 9 are compared with each other—Step 10. As a result of the comparison of the step 10, if the size of the next code word is larger than the size of the last empty space of the video segments, the steps 8 through 10 are repeatedly performed. If the size of the next code word is smaller than the size of the last empty space of the video segments, the bit stream corresponding to the next code word is stored in the last empty space of the video segments—Step 11. Accordingly, the video data are efficiently formatted.

The video data outputted from the variable length coding circuit 3 in the form of a bit stream is transformed by the formatting circuit 4 into a format for recording on the tape T, and then the formatted video data is given an error correction code by the error correction coding circuit 5. The video data having the error correction code therein is amplified by the record amplifying circuit 6 and is recorded on the tape T through the head H1.

Meanwhile, as a reproduction mode is set, when a recorded data is reproduced by the reproduction amplifying circuit 7, the error correction decoding circuit 8 decodes the error correction code added to the reproduction data and corrects the errors of the reproduced video data. The deformatting circuit 9 receiving the error-corrected data transforms the record formatting state into the original state.

At this time, the variable length decoding circuit 10 receiving the output data outputted from the deformatting circuit 9 recovers the video data in accordance with the variable length codes, and the reverse quantization circuit 11 reverse-quantizes the recovered data, so that the compressed video data is decompressed.

Thereafter, the reverse cosine transforming circuit 12 receiving the output data outputted from the reverse quantization circuit 11 performs a reverse cosine transforming and outputs the original video data.

As described above, a video recording method for a high definition/digital video cassette tape recorder according to the present invention is directed to improving the picture quality by efficiently storing pictorial data into empty spaces of video segments.

Instead of discarding all of the remaining redundant data stored in the memory VR and ending the formatting process when the size of the current remaining redundant data is larger than the size of the last empty space of the video segments (as in the conventional method), the present invention selectively discards one redundant data at a time and continuously searches for a remaining redundant data having a proper size so that it can be stored into the last empty space of the video segments. Therefore, the present invention allows all or most of the remaining spaces of video segments to be efficiently filled with appropriate remaining redundant data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a video data recording method for a digital video cassette tape reorder, wherein bit streams of video data are initially stored in video segments having remaining spaces, portions of the bit streams which are not initially stored in the video segments being sequentially stored in a memory as remaining bit streams, said video segments with a size of a remaining bit stream;
    repeating a comparing step until a remaining bit stream having a size which is not larger than the size of the last remaining space of the video segments is found; and
    storing the remaining bit stream found in said repeating step in the last remaining space of the video segments.

2. The method of claim 1, wherein said comparing step includes the step of:
    comparing the size of the last remaining space of the video segments with the size of a code word of said one remaining bit stream.

3. The method of claim 2, further comprising the step of:
    clearing said one remaining bit stream if the size of the last remaining space is smaller than the size of the code word.

4. The method of claim 3, wherein said comparing step includes the step of:
    comparing the size of the last remaining space with a size of a next code word from said next remaining bit stream.

5. The method of claim 4, wherein said repeating step includes the step of:
    searching for the next code word in the remaining bit streams, if the size of the last remaining space is smaller than the size of the code word of said one remaining bit stream.

6. A method of recording video data in a digital video cassette tape recorder, comprising the steps of:
    storing bit stream of video data in video segments;
    storing first remaining data of the bit streams left from said storing step when the size of each of the bit streams is larger than the size of a corresponding one of the video segments;
    storing the fist remaining data of the bit streams in empty spaces of the video segments;
    storing second remaining data left from said step of storing the first remaining data;
    comparing the size of the last empty space of the video segments with the size of a bit stream from the second remaining data;
    storing the bit stream, if the size of the bit stream is not larger than the last empty space of the video segments, in said last empty space of the video segments; and
    repeating said comparing step by comparing the size of the last empty space with the size of a next bit stream from the second remaining data, until a bit stream having a size which is not larger than the last empty space of the video segments is found.

7. The method of claim 6, wherein said comparing step includes the step of:
    comparing the size of the last empty space of the video segments with the size of a code word of said one bit stream.

8. The method of claim 7, further comprising the step of:
    clearing said one bit stream if the size of the last empty space is smaller than the size of the code word of said one bit stream.

9. The method of claim 8, wherein said repeating step includes the step of:
    comparing the size of the last empty space with the size of a next code word from said next bit stream.

10. A method for recording video data in a digital video cassette tape recorder, comprising the steps of:
    storing a bit stream of video data in video segments;
    temporarily storing data remaining from said storing step, when the size of the bit stream is larger than a size of the video segment;
    repeatedly comparing the size of a bit stream of said remaining data with the size of a last empty space of the video segments, until a bit stream of said remaining data whose size is not larger than the size of the last empty space of the video segments is found; and
    storing the found bit stream of said remaining data in the last empty space of the video segments.

11. The method of claim 10, wherein said repeatedly comparing step includes the step of:
    comparing the size of the last empty space of the video segments with the size of a code word of one bit stream from said remaining data.

12. The method of claim 11, further comprising the step of:
    clearing said one bit stream of said remaining data if the size of the last empty space of the video segments is smaller than the size of the code word.

13. The method of claim 12, wherein said repeatedly comparing step includes the step of:
    comparing the size of the last empty space of the video segments with the size of a next code word from a next bit stream of said remaining data.

14. The method of claim 13, wherein said repeatedly comparing step includes the step of:

searching for the next code word in said remaining data, if the size of the last empty space of the video segments is smaller than the size of the code word of said one bit stream of said remaining data.

* * * * *